(12) United States Patent
Berggren et al.

(10) Patent No.: US 11,277,811 B2
(45) Date of Patent: Mar. 15, 2022

(54) NETWORK COMMUNICATION DEVICE, USER COMMUNICATION DEVICE AND CORRESPONDING METHODS FOR DETERMINING POSITION OF A USER COMMUNICATION DEVICE IN A COMMUNICATION

(71) Applicant: Sony Mobile Communications Inc., Tokyo (JP)

(72) Inventors: Anders Berggren, Lund (SE); Basuki Priyanto, Lund (SE)

(73) Assignee: Sony Group Corporation, Tokyo (JP)

( * ) Notice: Subject to any disclaimer, the term of this patent is extended or adjusted under 35 U.S.C. 154(b) by 106 days.

(21) Appl. No.: 16/089,789

(22) PCT Filed: Mar. 31, 2016

(86) PCT No.: PCT/EP2016/057042
§ 371 (c)(1),
(2) Date: Sep. 28, 2018

(87) PCT Pub. No.: WO2017/167372
PCT Pub. Date: Oct. 5, 2017

(65) Prior Publication Data
US 2020/0305116 A1    Sep. 24, 2020

(51) Int. Cl.
*H04W 4/029*    (2018.01)
*H04W 64/00*    (2009.01)
(Continued)

(52) U.S. Cl.
CPC ......... *H04W 64/006* (2013.01); *G01S 5/0289* (2013.01); *G01S 11/06* (2013.01); *H04B 17/318* (2015.01); *H04W 4/029* (2018.02)

(58) Field of Classification Search
CPC . H04W 64/00; H04W 64/003; H04W 64/006; H04W 4/021; H04W 4/023;
(Continued)

(56) References Cited

U.S. PATENT DOCUMENTS 9,008,696 B1 *  4/2015  Beattie ................. H04W 76/14
                                                        455/456.3
2005/0080786 A1 *  4/2005  Fish ..................... G06F 16/9537
(Continued)

FOREIGN PATENT DOCUMENTS

CN    102970748 A    3/2013
CN    104025677 A    9/2014
(Continued)

OTHER PUBLICATIONS

International Search Report and Written Opinion from counterpart International Patent Application No. PCT/EP2016/057042, dated Nov. 29, 2016; 9 pages.
(Continued)

*Primary Examiner* — Jean A Gelin
(74) *Attorney, Agent, or Firm* — Tucker Ellis LLP

(57) ABSTRACT

Present invention relates to network communication devices and to user communication devices arranged to support a determination of a position of a user communication device in a communication network. Particularly said devices support a position determination, in which many (more than one) surrounding user communication devices are utilized for obtaining accurate positioning. Further, present invention relates to corresponding methods, computer program products and computer-readable recording media.

19 Claims, 12 Drawing Sheets

(51) Int. Cl.
*H04B 17/318* (2015.01)
*G01S 5/02* (2010.01)
*G01S 11/06* (2006.01)

(58) Field of Classification Search
CPC ..... H04W 4/025; H04W 4/026; H04W 4/027; H04W 4/029; H04W 4/08; H04M 1/72538; H04M 1/72572; H04M 2250/10
See application file for complete search history.

(56) References Cited

U.S. PATENT DOCUMENTS

| | | | |
|---|---|---|---|
| 2005/0266860 A1 | 12/2005 | Tamaki | |
| 2008/0287108 A1* | 11/2008 | Tien | H04W 4/024 455/414.1 |
| 2012/0246294 A1* | 9/2012 | Eaton | H04W 48/20 709/224 |
| 2013/0010617 A1* | 1/2013 | Chen | H04W 64/00 370/252 |
| 2013/0045759 A1* | 2/2013 | Smith | H04W 4/08 455/456.6 |
| 2013/0100850 A1* | 4/2013 | Zhang | G01S 5/14 370/254 |
| 2013/0297704 A1* | 11/2013 | Alberth, Jr. | H04L 67/142 709/205 |
| 2013/0310096 A1* | 11/2013 | Mueck | H04W 88/12 455/509 |
| 2014/0335889 A1* | 11/2014 | Witych | G01S 5/0289 455/456.1 |
| 2016/0084936 A1 | 3/2016 | Smith | |
| 2016/0381510 A1* | 12/2016 | Reynolds | H04B 17/318 455/456.1 |
| 2017/0237820 A1* | 8/2017 | Scarborough | G06Q 10/00 709/226 |
| 2017/0251347 A1* | 8/2017 | Mehta | H04W 4/90 |

FOREIGN PATENT DOCUMENTS

| | | |
|---|---|---|
| CN | 104768127 A | 7/2015 |
| CN | 104768127 * | 8/2015 |
| CN | 105392111 A | 3/2016 |

OTHER PUBLICATIONS

Chinese Office Action for corresponding Chinese Application No. 201680084367.3, dated Mar. 30, 2020, 11 pages.
Office Action from corresponding Chinese Application No. 201680084367.3, dated Jun. 1, 2021, 11 pages.

* cited by examiner

NETWORK COMMUNICATION DEVICE, USER COMMUNICATION DEVICE AND CORRESPONDING METHODS FOR DETERMINING POSITION OF A USER COMMUNICATION DEVICE IN A COMMUNICATION

TECHNICAL FIELD

Present invention relates to network communication devices and to user communication devices arranged to support a determination of a position of a user communication device in a communication network. Further, present invention relates to corresponding methods, computer program products and computer-readable recording media.

BACKGROUND

Recently, techniques for Internet of Things (IoT) become increasingly attractive. Internet of Things is a system of interrelated computing devices, mechanical and/or digital machines, and/or objects, referred to in general as "things" that are configured to communicate (i.e. transmit and/or receive) data over a communication network without requiring human-to-human and/or human-to-computer interaction. The "things", i.e. the devices communicating without human intervention, refer to a variety of different objects, devices and machines arranged to communicate over a communication network. They may comprise heart monitor implants, biochip transponders, vehicles, sensors, actuators, phones, household appliances etc. Because they are not devices of a communication network, i.e. devices that ensure the operation of the communication network, but use the communication network for communication purposes, they will be referred to in general as "user communication devices". In general, each of the "things" or user communication devices has a unique address, which is used for communicating over the communication network.

For communication purposes, positions of the user communication devices have to be determined and known. In this way, positioning requirements of regulatory bodies (e.g., of Federal Communications Commission (FCC)) are fulfilled and/or various levels of applications are provided or enabled respectively. Known positioning techniques comprise, for example, long-term evolution (LTE) observed time difference of arrival (OTDOA), cell-ID positioning, global navigation satellite system (GNSS) and global positioning system (GPS).

OTDOA is a technique that determines position of a user communication device by triangulation of at least three base stations, as exemplary shown in FIG. 1. According to the OTDOA technique, a user communication device 11 receives specific signals from three base stations 10. A triangulation method uses the specific signals, as received by the user communication device 11, and determines the position of the communication device 11. However, the determining is executed within a particular position estimation range 13 and with a certain measurement error range 12 such that the result of the determining of the position of the communication device 11 is not accurate. In particular, OTDOA has been proven to provide inaccurate positioning for limited operating bandwidth cases.

The cell-ID positioning technique is easy to implement. However, also the cell-ID positioning technique provides inaccurate positioning results.

Thus, there is still a need for further positioning techniques, i.e. methods for determining positions of user communication devices that provide accurate positioning results, i.e. accurate positions of the user communication devices, that work well both in indoor as well as in outdoor scenarios and may be implemented in an efficient way, e.g., without increasing amount of resources involved for the position determination and, thus, without increasing positioning method implementation complexity.

SUMMARY

The present invention enables an accurate determination of positions of user communication devices. Furthermore, the position determination technique of the present invention works well in both indoor and outdoor scenarios. Moreover, the positioning technique of the present invention does not require any introduction and/or implementation of additional resources in the communication network. Rather, it may be implemented in an easy and efficient way.

It is noted, that according to the present invention, the term "user communication device" covers both user communication devices that communicate according to the above-mentioned IoT technique and user communication devices that communicate with regard to and/or in response to human-to-human and/or human-to-computer interaction, i.e. "conventional" user communication devices.

The general idea of the present invention is to utilize user communication devices surrounding a user communication device to determine the position of the user communication device.

Objects and advantages of the present invention are achieved by subject matters of independent claims, wherein further exemplary and supplementing embodiments are specified in dependent claims as well as in the present description and attached figures.

In particular, present invention refers to a network communication device arranged to coordinate a determination of a position of a user communication device in a communication network, wherein the network communication device is configured to: select a set of reference user communication devices in the communication network; and instruct a determining of relative distances between each reference user communication device of the selected set of reference user communication devices and the user communication device for the determination of the position of the user communication device.

According to an embodiment of the present invention, the network communication device is configured to identify reference user communication devices in the communication network, wherein a user communication device of the communication network is identified as a reference user communication device if: position of the user communication device in the communication network is known; or the position of the user communication device in the communication network is known and range of movement of the user communication device within a time period before current time is below a movement threshold.

According to an embodiment of the present invention, the network communication device is configured to execute said identifying with regard to user communication devices in the communication network, distances of which to the network communication device are below a reference device threshold and/or which are located in an area of the communication network.

According to an embodiment of the present invention, the network communication device is configured to select the set of reference user communication devices from a group of reference user communication devices, wherein the group comprises reference user communication devices, distances of which to the network communication device are within a range that comprises a relative distance between the network communication device and the user communication device.

According to an embodiment of the present invention, the network communication device is configured to select the set of reference user communication devices from the group by selecting reference user communication devices of the group, which are within a proximity of the user communication device.

According to an embodiment of the present invention, a reference user communication device is determined as being within the proximity of the user communication device if: a relative distance between the reference user communication device and the user communication device is within a proximity distance range; and/or a discrepancy or deviation of a direction from the network communication device to the user communication device from a direction from the network communication device to the reference user communication device is smaller than a discrepancy or deviation threshold.

According to an embodiment of the present invention, the network communication device is configured to execute said selecting by determining at least two groups among the reference user communication devices in the communication network according to: a distance of each reference user communication device in the communication network to the network communication device, wherein each group comprises reference user communication devices, distances of which are in a distance range associated to the group; or a timing advance between each reference user communication device in the communication network to the network communication device and the distance of each reference user communication device in the communication network to the network communication device, wherein each group comprises reference user communication devices, distances of which are in the distance range associated to the group and timing advances of which are in a timing advance range associated to the group.

According to an embodiment of the present invention, each group of the at least two groups comprises at least one, at least two or at least three reference user communication devices.

According to an embodiment of the present invention, the network communication device is configured to execute said instructing by: transmitting to each reference user communication device of the selected set of reference user communication devices a corresponding instruction instructing a transmission of a corresponding device positioning signal by the corresponding reference user communication device to the user communication device; and transmitting to the user communication device an instruction instructing a reception of a corresponding device positioning signal from each reference user communication device of the selected set of reference user communication devices by the user communication device.

According to an embodiment of the present invention, the corresponding instruction, transmitted to each reference user communication device of the selected set of reference user communication devices, comprises a corresponding schedule for the transmission of the corresponding device positioning signal by the corresponding reference user device to the user communication device; and/or the instruction, transmitted to the user communication device, comprises a schedule for the reception of the corresponding device positioning signal from each reference user communication device of the selected set of reference user communication devices.

According to an embodiment of the present invention, the network communication device is configured to repeat the selecting of the set of reference user communication devices and the instructing of the determining of relative distances, if quality of the determined relative distances is not sufficient for a predetermined number of the relative distances and/or for a predetermined percentage of the determined relative distances.

According to an embodiment of the present invention, the quality of a determined relative distance is sufficient, if strength of a signal used for determining the corresponding relative distance is above a threshold, and wherein the quality of the determined relative distance is not sufficient, if the strength of the signal used for determining the corresponding relative distance is below the threshold.

According to an embodiment of the present invention, the selected set of reference user communication devices comprises at least one, at least two or at least three reference user communication devices.

According to an embodiment of the present invention, the network communication device is a base station or an access point.

Present invention refers further to a method arranged for execution by a network communication device and arranged to coordinate a determination of a position of a user communication device in a communication network, wherein the method comprises the steps of: selecting a set of reference user communication devices in the communication network; and instructing a determining of relative distances between each reference user communication device of the selected set of reference user communication devices and the user communication device for the determination of the position of the user communication device. Particularly, the method comprises steps executed by the aforementioned network device that is described in more detail below.

The present invention refers also to a computer program product comprising computer readable program code that is configured to cause a computing device to execute steps of the aforementioned method that is described in more detail below. According to an embodiment, the computer readable program code is embodied in a computer-readable medium. According to a further embodiment, the computer-readable medium is a non-transitory computer-readable medium. According to an embodiment, the computing device is a processor or any other computer configured to execute computer readable program code.

Moreover, the present invention refers also to a computer-readable recording medium configured to store therein the aforementioned computer program product. According to an embodiment, the computer-readable medium is a non-transitory computer-readable medium.

Present invention refers also to a user communication device arranged to support a determination of a position of the user communication device in a communication network, wherein the user communication device is configured to: determine relative distances from the user communication device to each reference user communication device of a selected set of reference user communication devices for the determination of the position of the user communication device in the communication network.

According to an embodiment of the present invention, the user communication device is further configured to: receive, from a network communication device, an instruction, said instruction instructing a reception from each reference user communication device of the selected set of reference user communication devices a corresponding device positioning signal, and receive, from each reference user communication device of the selected set of reference user communication devices, the corresponding device positioning signal; or receive, from each reference user communication device of the selected set of reference user communication devices, a corresponding device positioning signal.

According to an embodiment of the present invention, the user communication device is further configured to: determine a corresponding relative distance to each reference user communication devices of the selected set of reference user communication devices in response to the receipt of the corresponding device positioning signal from the corresponding reference user communication device; determine the corresponding relative distance to each reference user communication device of the selected set of reference user communication devices by use of the corresponding device positioning signal received from the corresponding reference user communication device and/or by use of signal strength of the corresponding device positioning signal; determine quality of each of the determined relative distances; determine the quality of each of the determined relative distances by use of the corresponding device positioning signal received from the corresponding reference user communication device and/or by use of strength of the corresponding device positioning signal; and/or determine the quality of each of the determined relative distances by comparing the strength of the corresponding device positioning signal with a threshold.

According to an embodiment of the present invention, the user communication device is configured to: determine that the quality of a determined relative distance is sufficient, if the strength of the corresponding device positioning signal is above the threshold; and determine that the quality of the determined relative distance is not sufficient, if the strength of the corresponding device positioning signal is below the threshold.

According to an embodiment of the present invention, the instruction comprises a schedule for the reception of the corresponding device positioning signal from each reference user communication device of the selected set of reference user communication devices. The term "schedule" specifies a timetable. It consists of a list of times at which possible tasks, events, or actions are intended to take place, or of a sequence of tasks, events, or actions in the chronological order in which the tasks, events, or actions are intended to take place.

According to an embodiment of the present invention, the user communication device is configured to receive, from each reference user communication device of the selected set of reference user communication devices, the corresponding device positioning signal according to the schedule.

According to an embodiment of the present invention, the network communication device is a base station or an access point.

According to an embodiment of the present invention, the user communication device is configured to provide to a further network communication device for said determining of the position of the user communication device in the network: the relative distances; and/or quality information of each of the relative distances, said quality information indicating quality of the corresponding relative distance.

According to an embodiment of the present invention, the further network communication device is a location server.

Present invention relates also to a method arranged for execution by user communications device of a communication network and arranged to support a determination of a position of a user communication device in a communication network, wherein the method comprises the step of: determining relative distances from the user communication device to each reference user communication device of a selected set of reference user communication devices for the determination of the position of the user communication device in the communication network. In particular, the method is arranged to execute steps of the aforementioned user communication device that is described in more detail below.

The present invention refers also to a computer program product comprising computer readable program code that is configured to cause a computing device to execute steps of the aforementioned method that is described in more detail below. According to an embodiment, the computer readable program code is embodied in a computer-readable medium. According to a further embodiment, the computer-readable medium is a non-transitory computer-readable medium. According to an embodiment, the computing device is a processor or any other computer configured to execute computer readable program code.

Moreover, the present invention refers also to a computer-readable recording medium configured to store therein the aforementioned computer program product. According to an embodiment, the computer-readable medium is a non-transitory computer-readable medium.

Furthermore, present invention relates to a user communication device arranged to support a determination of a position of a further user communication device in a communication network, wherein the user communication device is configured to: receive, from a network communication device, an instruction instructing a transmission of a device positioning signal to the further user communication device; and transmit the device positioning signal to the further user communication device.

According to an embodiment of the present invention, the instruction comprises a schedule for the transmission of the device positioning signal to the further user communication device.

According to an embodiment of the present invention, the user communication device is configured to transmit the device positioning signal to the further user communication device according to the schedule.

According to an embodiment of the present invention, the network communication device is a base station or access point.

Present invention refers further to a method arranged for execution by user communications device of a communication network and arranged to support a determination of a position of a further user communication device in the communication network, wherein the method comprises the following steps of: receiving, from a network communication device, an instruction instructing a transmission of a device positioning signal to the further user communication device; and transmitting the device positioning signal to the further user communication device.

The present invention refers also to a computer program product comprising computer readable program code that is configured to cause a computing device to execute steps of the aforementioned method that is described in more detail below. According to an embodiment, the computer readable program code is embodied in a computer-readable medium. According to a further embodiment, the computer-readable medium is a non-transitory computer-readable medium.

According to an embodiment, the computing device is a processor or any other computer configured to execute computer readable program code.

Moreover, the present invention refers also to a computer-readable recording medium configured to store therein the aforementioned computer program product. According to an embodiment, the computer-readable medium is a non-transitory computer-readable medium.

Furthermore, present invention relates to a network communication device arranged to support a determination of a position of a user communication device in a communication network, wherein the network communication device is configured to: receive from the user communication device relative distances between each reference user communication device of a selected set of reference user communication devices and the user communication device; and determine the position of the user communication device by use of the relative distances.

According to an embodiment of the present invention, the network communication device is configured to receive from the user communication device a quality information for each relative distance, said quality information indicating quality of the corresponding relative distance.

According to an embodiment of the present invention, the relative distances comprise at least three relative distances and the network communication device is configured to determine the position of the user communication device by executing a triangulation method with regard to three relative distances of the relative distances and to three reference user communication devices, with regard to which the three relative distances have been determined.

According to an embodiment of the present invention, the network communication device is a location server.

Present invention relates also to a method arranged for execution by a network communication device and arranged to support a determination of a position of a user communication device in a communication network, wherein the method comprises the following steps of: receiving from the user communication device relative distances between each reference user communication device of a selected set of reference user communication devices and the user communication device; and determining the position of the user communication device by use of the relative distances.

The present invention refers also to a computer program product comprising computer readable program code that is configured to cause a computing device to execute steps of the aforementioned method that is described in more detail below. According to an embodiment, the computer readable program code is embodied in a computer-readable medium. According to a further embodiment, the computer-readable medium is a non-transitory computer-readable medium. According to an embodiment, the computing device is a processor or any other computer configured to execute computer readable program code.

Moreover, the present invention refers also to a computer-readable recording medium configured to store therein the aforementioned computer program product. According to an embodiment, the computer-readable medium is a non-transitory computer-readable medium.

It has to be noted that the disclosed embodiments can be combined with each other and are not intended for an individual consideration and implementation.

BRIEF DESCRIPTION OF THE DRAWINGS

In the following, embodiments of the present invention are described with reference to accompanying drawings in which the same or similar reference numerals designate the same or similar elements.

DETAILED DESCRIPTION OF EMBODIMENTS

In the following, exemplary embodiments of the present invention are described with reference to the attached drawings. Features of the various exemplary embodiments may be combined with each other unless specifically stated otherwise.

Figure 1:
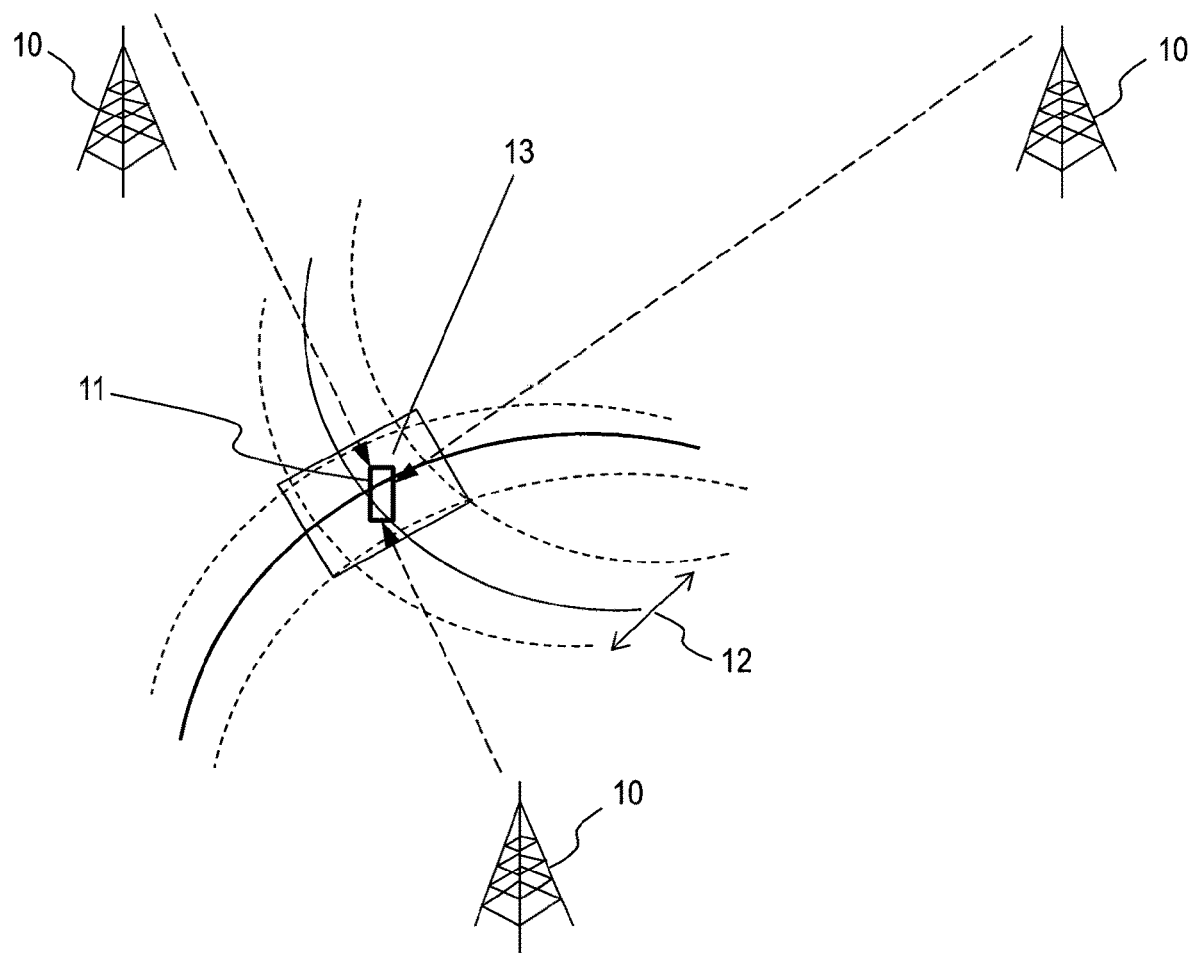
FIG. 1 illustrates a schematic view of a determination of a position of a user communication device according to an OTDOA triangulation method of the prior art.
Figure 2:
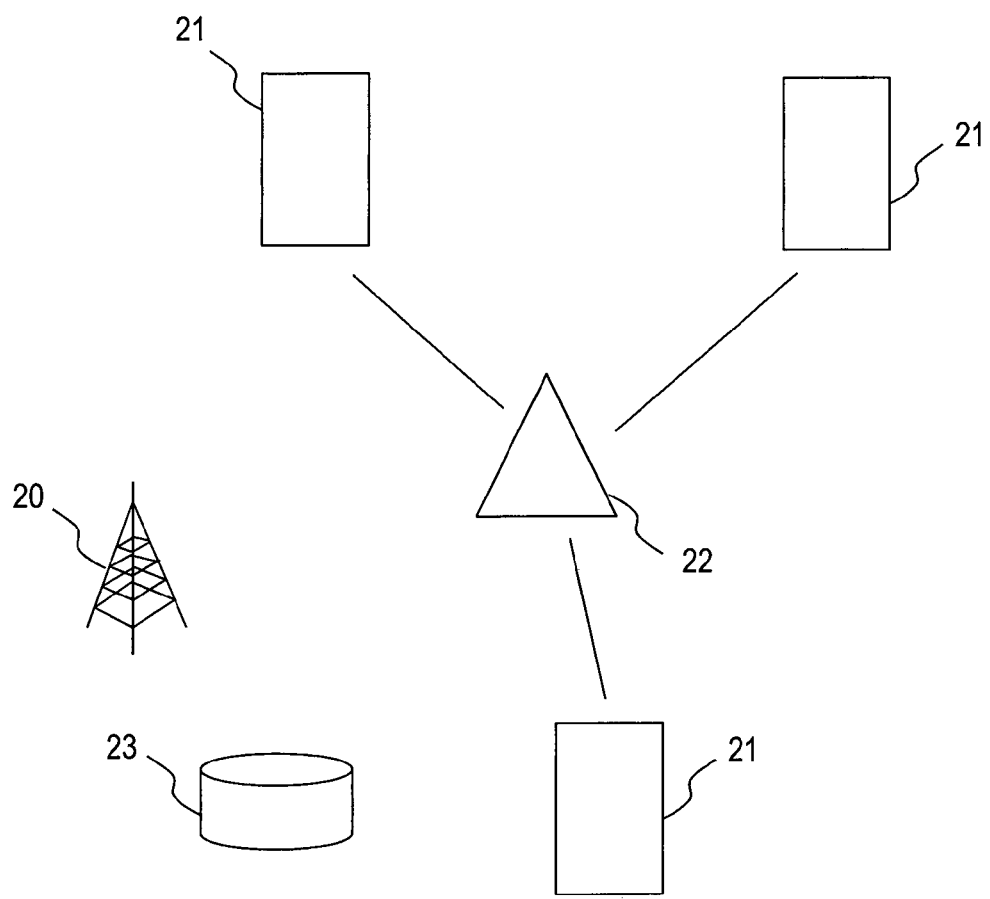
FIG. 2 illustrates a schematic view of a determination of a position of a user communication device according to an embodiment of the present invention.

FIG. 2 is a schematic view of a determination of a position of a user communication device 22 according to an embodiment of the present invention. According to FIG. 2, for determining the position of user communication device 22, three user communication devices 21 are used as reference user communication devices, i.e. user communication devices positions of which in the communication network are known. Here, it has to be noted that the present invention is not limited to three reference user communication devices 21. FIG. 2 shows just an exemplary embodiment that should be clearly arranged for better understanding. According to further embodiments, also one, at least one, two, at least two, at least three or more than three, e.g. a plurality of reference user communication devices 21 are used. According to embodiment of FIG. 2, two network communication devices 20, 23 are used. According to the present embodiment, they comprise a base station 20 and a location server (LS) 23. Further, according to the present embodiment, base station 20 coordinates the determination of the position of user communication device 22. In particular, it instructs determining of relative distances between each reference user communication device 21 and user communication device 22. For this purpose, base station 20 transmits corresponding instructions to each of the reference user communication devices 21 and to user communication device 22. The reference user communication devices 21 are instructed to transmit corresponding device positioning signals to user communication device 22. User communication device 22 is instructed to receive the corresponding device positioning signals. According to an embodiment, instructions transmitted by base station 20 comprise schedules for the corresponding transmissions and receptions of the device positioning signals. In this way, base station 20 decides on times at which the transmissions and receptions of the device positioning signals are executed.

Each of the reference user communication devices 21 transmits a corresponding device positioning signal to user communication device 22 as instructed by base station 20. User communication device 22 receives the device positioning signals from each of the reference user communication devices 21 as instructed by base station 20. User communication device 22 determines corresponding relative distances between each of the reference user communication devices 21 and the user communication device 22. According to the present embodiment, user communication device 22 considers each received device positioning signal and determines the relative distance between itself and the reference user communication device 21, which transmitted the corresponding device positioning signal, by use of the strength of the device positioning signal. For this purpose, user communication device 22 is arranged to apply any of corresponding known relative distance determination methods that are based on signal strength.

After determining the relative distances, user communication device 22 transmits to location server 23 at least one report comprising the determined relative distances. Location server 23 uses the report and, in particular, the determined relative distances, specified or reported in the report, for determining the location of the user communication device 22.

Figure 3:
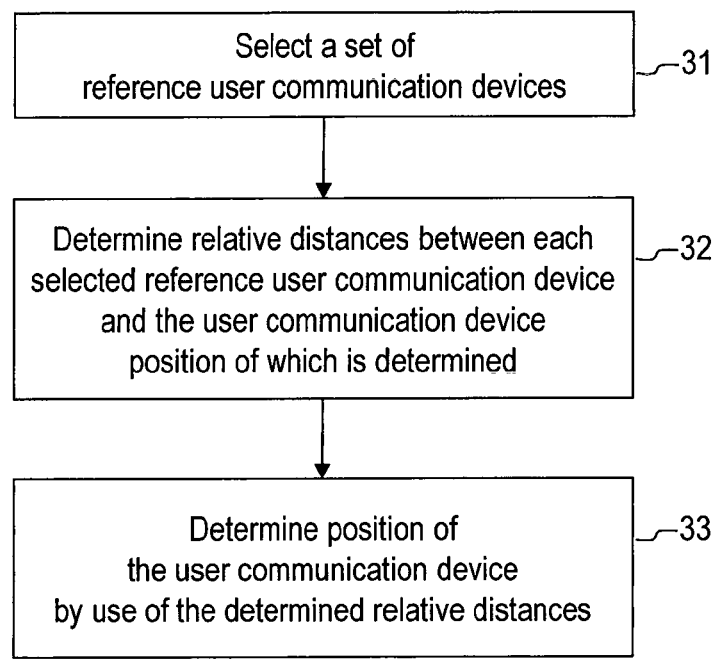
FIG. 3 illustrates a flowchart showing steps for execution of a determination of a position of a user communication device according to an embodiment of the present invention.

FIG. 3 is a flowchart showing steps for execution of a determination of a position of user communication device 22 according to an embodiment of the present invention. In particular, the flowchart of FIG. 3 indicates the steps, executed to determine the position of user communication device 22, in general.

In step 31, a set of reference user communication devices 21 is selected by a network communication device like base station 20, for example. In step 32, relative distances between each reference user communication device 21 of the selected set of reference user communication devices and the user communication device 22 are determined or measured. For this purpose, the coordination of the determination of the position of the user communication device 22 is executed by a network communication device like base station 20, wherein the coordination comprises instructing the selected reference user communication devices 21 to transmit corresponding device positioning signals and instructing the user communication device 22 to receive the corresponding device positioning signals. After receiving the device positioning signals, the user communication device 22 determines corresponding relative distances between itself and each of the reference user communication devices 21.

In step 33, position of the user communication device 22 is determined by use of the determined relative distances. For this purpose, any appropriate known method can be used. Step 33 is performed according to an embodiment by a network communication device like location server 23, for example.

Figure 4:
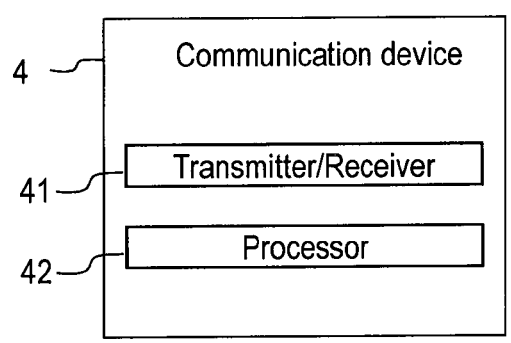
FIG. 4 illustrates a block diagram of a communication device according to an embodiment of the present invention.

FIG. 4 is a block diagram of a communication device 4 according to an embodiment of the present invention. The communication device 4 represents an abstract arrangement of each of the following: user communication device 22, reference user communication devices 21, network communication devices like base station 20 and location server 23, for example. Thus, according to embodiments of the present invention, anyone or each of the devices 20 to 23 is arranged as exemplary shown with regard to the rather abstract communication device 4.

According to FIG. 4, communication device 4 comprises a transmitter/receiver 41 that is configured to communicate with other communication devices 4 via the communication network, i.e. to execute corresponding transmissions and/or receptions like those described in the present application, for example. According to a further embodiment, the transmitter/receiver 41 is arranged as one component arranged to execute corresponding transmissions and receptions of signals, data, information etc. According to another embodiment, the transmitter/receiver 41 is arranged as one component arranged to execute corresponding transmissions or receptions of signals, data, information etc. According to further embodiment, the transmitter/receiver 41 is arranged as an arrangement of (at least two) components, each arranged to execute corresponding transmissions and/or receptions of signals, data, information etc. For example, one of components of the transmitter/receiver arrangement 41 is arranged to execute corresponding transmissions and another one of components of the transmitter/receiver arrangement 41 is arranged to execute corresponding receptions. Further, communication device 4 comprises a processor 42 that is configured to execute steps that, in general, are performed by communication device 4, except for communicating with other communication devices 4. Thus, if the communication device 4 is user communication device 22, position of which is determined, processor 42 is configured to execute the steps or actions of user communication device 22 as described herein. If the communication device 4 is reference user communication device 21, processor 42 is configured to execute the steps or actions of reference user communication device 21 as described herein. If the communication device 4 is a network communication device such as base station 20 or location server 23, processor 42 is configured to execute the steps or actions of the corresponding network communication device as described herein.

FIG. 5a to FIG. 5d illustrate a chart showing steps for execution of a determination of position of a user communication device 22 according to an embodiment of the present invention. In FIGS. 5a to 5d, vertical lines indicate time and, thus, also the relative timing of the executed steps. In particular, FIGS. 5a to 5d.

In step 500, a network communication device like base station 20, for example, identifies user communication devices in the communication network that can be used as reference user communication devices 21. The identifying 500 of the reference user communication devices 21 comprises verifying whether a user communication device meets particular constraints.

In particular, it is verified whether or not the position of a user communication device in the communication network is known. For this purpose, according to an embodiment, the network communication device such as base station 20 is configured to communicate with local server 23 for retrieving information on positon of a user communication device in the communication network and/or to apply any of known positioning method (e.g. OTDOA, GPS, etc.) for detecting the positon of the user communication device.

According to a further supplementing embodiment, static and/or semi-static position conditions are verified, wherein semi-static user communication devices are devices that change their locations with a relatively low frequency and static user communication devices are devices that do not change their locations. Thus, according to said further supplementing embodiment, it is verified with regard to each relevant user communication device whether a range of the movement of the user communication device within a time period before current time, e.g. time at which the identification step 500 has been started, is below a movement threshold. According to an embodiment, the movement threshold is a predetermined movement threshold. In case the movement threshold is equal zero, static user communication devices will be considered as possible reference user communication devices. The required information on the movement of a particular user communication device, verified in identification step 500, is detected, according to an embodiment, by analysing history of positions of the user communication device, by analysing a history of accelerometer report, and/or by analysing any further information relating to and/or indicating previous positions of the user communication device. According to a supplementary embodiment, the network communication device like base station 20, for example, is configured to communicate with local server 23 for retrieving corresponding position information of a user communication device in the communication network.

Furthermore, according to a supplementary embodiment the network communication device like the base station 20, for example, does not consider all user communication devices of the communication network in identification step 500 to save the computation time and to maintain the efficiency. The network communication device like base station 20, for example, performs the identifying with regard to user communication devices in the communication network, distances of which to the network communication device like the base station 20, for example, are below a reference device threshold and/or which are located in a particular (e.g. predetermined) area of the communication network.

In step 501, the network communication device like base station 20, for example, detects location information relating to the user communication device 22. According to an embodiment, a relative distance from the network communication device like base station 20, for example, to the user communication device 22 is determined. For this purpose, any known relative distance determination method can be applied. For example, the network communication device such as base station 20 transmits a signal to the user communication device 22, and the user communication device 22 uses the signal (e.g. measures the strength of the signal) for determining the relative distance. For this purpose, according to an embodiment, the user communication device 22 is configured to execute any suitable known relative distance determination or measuring method.

According to a further supplementary embodiment, a direction from the network communication device like base station 20, for example, to the user communication device 22 is determined as location information. Also here, any known direction determination method can be applied.

In step 502, the network communication device such as base station 20 groups the identified reference user communication devices 21 according to their distances to the network communication device such as base station 20. To each group a corresponding distance range is assigned. A reference user communication device 21 is detected or identified as belonging to a particular group, it its distance to the network communication device such as base station 20 is within the distance range of the particular group. According to an embodiment, the distance ranges of the groups do not overlap, while according to another embodiment overlaps are permitted. According to an embodiment, distances between the network communication device such as base station 20 and the reference user communication devices 21 are determined by executing known positioning methods (e.g. OTDOA, GPS, etc.).

In step 502, at least two groups of identified reference user communication devices 21 are determined.

According to a further embodiment, grouping 502 of reference user communication devices 21 is executed also by using timing advance measurements, which can be executed by any of known timing advance measurement techniques. Thus, grouping step 502 is executed by using both information relative distances and timing advance measurements. In this embodiment, a reference user communication device 21 is determined as belonging to a group if its relative distance is within the relative distance range of the group and if its timing advance is within a timing advance range associated to the group. In particular, according to an embodiment, timing advances are mapped to relative distances, and a classification of timing advances (e.g. timing advance reports) and relative distances (obtained, for example, by using legacy positioning comprising, for example, OTDOA, GPS etc) is executed. According to an embodiment, the timing advance measurements are performed if the communication is a Long Term Evolution (LTE) network, for example.

By use of the determined groups, it becomes possible to identify reference user communication devices 21 that are close and/or could be close to the user communication device 22, i.e. that are in the proximity and/or could be in the proximity of the user communication device 22.

In step 503, the network communication device such as base station 20 selects a set of reference user communication devices 21. The selecting is executed by use of location information of the user communication device 22. As described above with regard to step 501, the location information comprises the relative distance between the network communication device such as base station 20 and the user communication device 22. According to a further supplementary embodiment, the location information comprises also the direction form the network communication device such as base station 20 to the user communication device 22.

According to the present embodiment, reference user communication devices 21 of a group are selected, distance range of which comprises the relative distance between the network communication device such as base station 20 and user communication device 20. According to an embodiment, a random selection of reference user communication devices 21 from the group is executed.

According to a further supplementing embodiment, the direction from the network communication device such as base station 20 to user communication device 22 is known and/or an approximate position of user communication device 22 is known. According to this embodiment, a more sensitive or more fine selection of a set of reference user communication devices 21 from the group is executed by taking into account also the direction and/or approximate position information, i.e. by selecting reference user communication devices 21 that are in the proximity of user communication device 22. Thus, a reference user communication device 21 of the group is selected if: the relative distance between reference user communication device 21 and user communication device 22 is within a proximity distance range; and/or if a discrepancy of a direction from the network communication device such as base station 20 to user communication device 22 from a direction from the network communication device such as base station 20 to reference user communication device 21 is smaller than a discrepancy threshold. According to an embodiment, the proximity distance range is a predetermined range or is computed in view of a number of reference user communication devices 21 around the approximate position of user communication device 22. Similarly, according to an embodiment, the discrepancy threshold is a predetermined threshold or is computed in view of a number of reference user communication devices 21 around the approximate position of user communication device 22. Thus, many reference user communication devices 21 of the group around the approximate position of the user communication device 22 will lead to a smaller proximity range and/or to a smaller discrepancy threshold, and view reference user communication devices 21 of the group around the approximate position of user communication device 22 will lead to a larger proximity range and/or to a larger discrepancy threshold. The computation of the proximity range and/or of the discrepancy threshold depends then on the number of reference user communication devices 21 to be selected for the set.

In step 504, the network communication device such as base station 20 instructs a determining of relative distances between each reference user communication device 21 of the selected set of reference user communication devices 21 and user communication device 22. In particular, the network communication device such as base station 20 instructs in a sub-step 5041 each reference user communication device 21 of the selected set of reference user communication devices 21 to transmit a corresponding device positioning signal by transmitting a corresponding instruction to the corresponding reference user communication device 21. In sub-step 5042, the network communication device such as base station 20 instructs the user communication device 22 to receive from each reference user communication device 21 of the selected set of reference user communication devices 21 the corresponding device positioning signal by transmitting a corresponding instruction to user communication device 22.

According to a supplementary embodiment, the instructions comprise schedules. The network communication device such as base station 20 is configured to generate the schedules. Thus, the instruction transmitted to a reference user communication device 21 comprises a schedule for transmitting the device positioning signal to user communication device 22. The instruction transmitted to user communication device 22 comprises a schedule for receiving the device positioning signal.

Figure 5A:
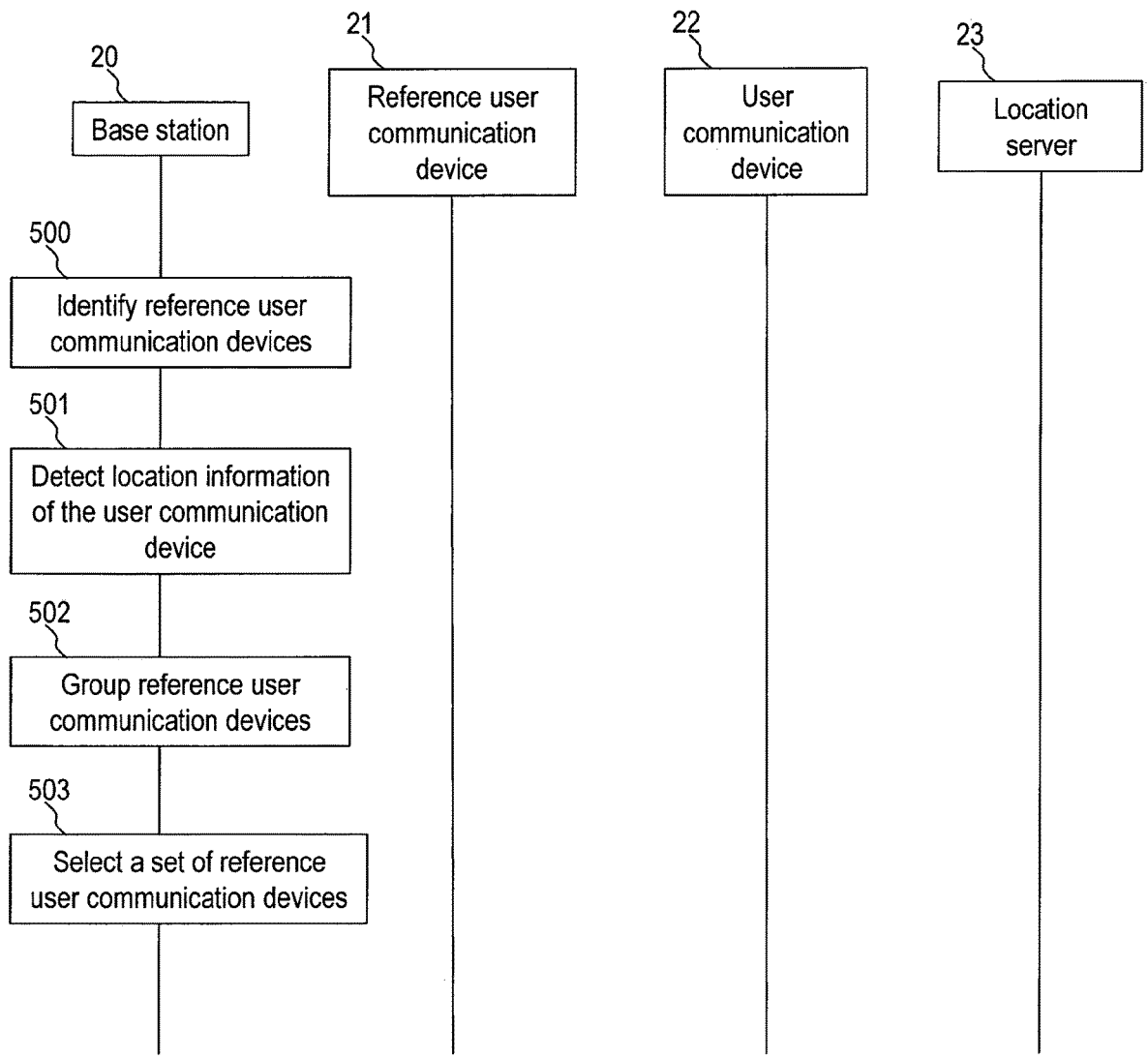
FIG. 5a to FIG. 5d illustrate a chart showing steps for execution of a determination of position of a user communication device according to an embodiment of the present invention.
Figure 5B:
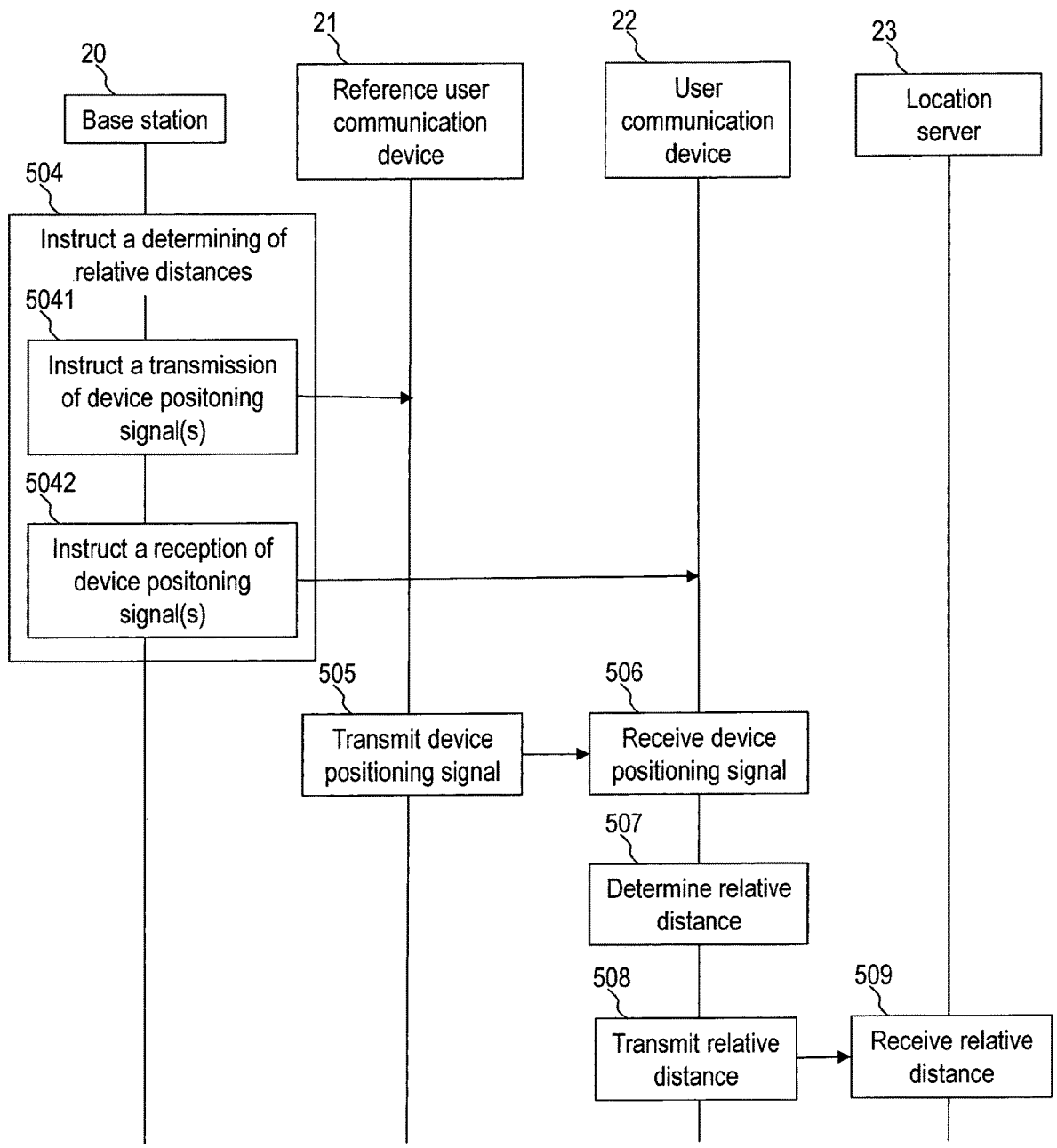

In FIG. 5b, sub-steps 5041 and 5042 are shown as being executed sequentially such that sub-step 5042 follows the sub-step 5041. However, according to another embodiments, said sub-steps 5041, 5042 are executed in the opposite order such that sub-step 5042 follows sub-step 5041 or are executed simultaneously or essentially simultaneously.

In step 505, each reference user communication device 21 of the selected set of reference user communication devices 21 transmits the corresponding device position signal according to the corresponding instruction, e.g. according to the corresponding schedule. In step 506, user communication device 22 receives from each reference communication device 21 of the selected set of reference user communication devices 21 the corresponding device positioning signal according to the instruction of the network communication device such as base station 20, e.g. according to the schedule.

According to an embodiment, the device positioning signal is arranged such and/or transmitted such that user communication device 22 is able to perform a signal strength measurement or determination of said device positioning signal. According to a further embodiment, if user communication device 22 is an IoT device, the corresponding device positioning signal is transmitted by each reference user communication device 22 at a frequency and bandwidth of the user communication device 22, i.e. of a user communication device in IoT.

In step 507, user communication device 22 measures or determines corresponding relative distances to each reference communication device 21 of the selected set of reference user communication devices 21 based on the corresponding device positioning signal. For this purpose, user communication device 22 is arranged to execute anyone of known methods for determining or measuring relative distances. For example, user communication device 22 determines strengths of device positioning signals for measuring or determining the corresponding relative distances.

Additionally, according to an embodiment, user communication device 22 measures or determines in step 507 the quality of the corresponding determined relative distances. For example, if measuring or determining of the relative distances has been executed by measuring or determining strengths of device positioning signals, according to an embodiment, the quality of each determined relative distance is measured or determined with regard to the strength of the corresponding device positioning signal. According to an embodiment, the user communication device 22 measures or determines the quality of each of the measured or determined relative distances by comparing the strength of the corresponding device positioning signal, used for measuring or determining the relative distances, with a threshold. According to an embodiment, the quality of a determined or measured relative distance is determined as being sufficient, if the strength of the corresponding device positioning signal is above the threshold, and the quality of a determined or measured relative distance is determined as being not sufficient, if the strength of the corresponding device positioning signal is below the threshold.

In step 508, user communication device 22 transmits the determined or measured relative distances to a network communication device such as location server 23. The transmission 508 of the determined relative distances is executed according to an embodiment at a predetermined time. According to an embodiment, the user communication device 22 transmits a report to the network communication device such as location server 23, wherein the report comprises the determined relative distances (e.g., for each reference user communication device 22, a corresponding distance and an identifier of the corresponding user communication device 22).

Additionally, according to an embodiment, in step 508, user communication device 22 transmits for each of the determined or measured relative distances a corresponding quality information indicating the quality of the corresponding determined relative distances. According to an embodiment, the quality information indicates whether the quality of the corresponding relative distance is sufficient or not.

Further, according to an embodiment, user communication device 22 transmits in step 508 only such determined or measured relative distances, quality of which is sufficient. If the quality of a determined or measured relative distance is not sufficient, neither the determined or measured relative distance nor its quality information is transmitted to the network communication device such as location server 23 in step 508.

The network communication device such as location server 23 receives in step 509 the determined relative distances, e.g., an report on the determined relative distances. Based on this information, network communication devices such as location server 23 and/or base station 20 derive information on area of the communication network in which user communication device 22 is located or an approximated position of user communication device 22 in the communication network respectively.

Additionally, according to an embodiment, network communication device such as location server 23 receives in step 509 the quality information for each of the determined relative distances.

Further, according to an embodiment, the network communication device such as location server 23 is configured to verify the quality of the determined or measured relative distances. This is done in step 510. As explained above, each of the determined relative distances has a corresponding quality information that indicates whether the quality of the corresponding relative distance is sufficient or not. If the quality information, has been transmitted to the network communication device such as location server 23, said network communication device is able to verify whether the reference user communication devices 21 of the selected set of reference user communication devices were able to lead to a determination of relative distances to the user communication device 22 that altogether have sufficient quality. For this purpose, the network communication device(s) such as location server 23 and/or base station 20 verifies the overall or total quality of all determined or measured relative distances. In particular, the network communication device such as location server 23 determines that the overall or total quality of the determined or measured relative distances is not sufficient if the quality of the determined or measured relative distances is not sufficient for a predetermined number of the relative distances and/or for a predetermined percentage of the determined relative distances. The network communication device such as location server 23 determines that the overall or total quality of the determined or measured relative distances is sufficient if the quality of the determined or measured relative distances is sufficient for a predetermined number of the relative distances and/or for a predetermined percentage of the determined relative distances.

If the network communication device such as location server 23 determines that the overall or total quality is not sufficient, the selecting of a set of reference user communication devices 21 and the determining of relative distances with regard to set of reference user communication devices 21 is repeated. During the repetition, a more sensitive or fine selecting of reference user communication devices 21 and, thus, more accurate determining of relative distances with improved quality are executed based on information collected, determined, derived and/or measured previously. Further, it is noted that it is not necessary to execute some steps, if it can be awaited that their results will not change when repeated. Thus, for example, it is not mandatory to repeat steps 500 to 502.

Figure 5C:
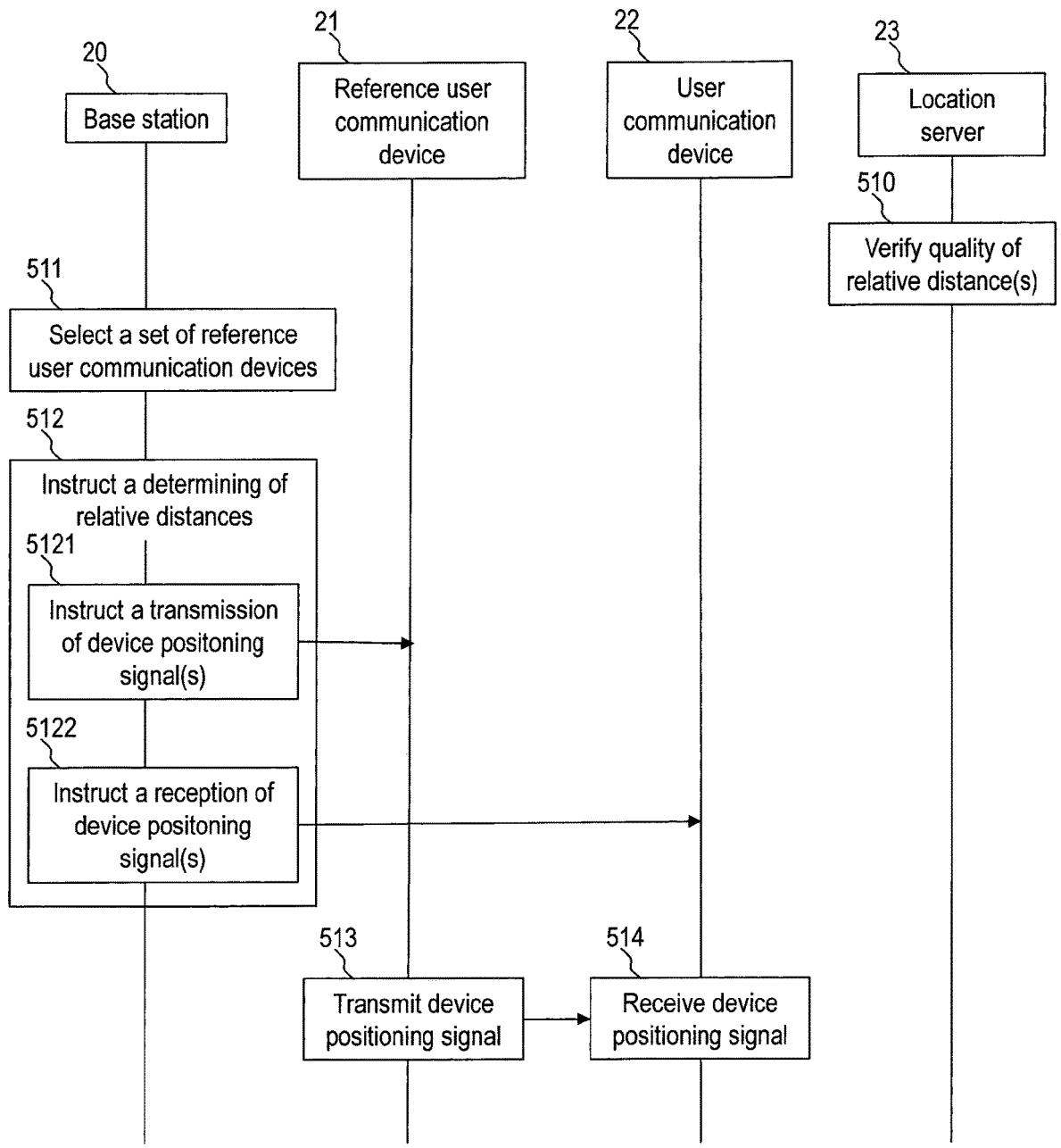
Figure 5D:
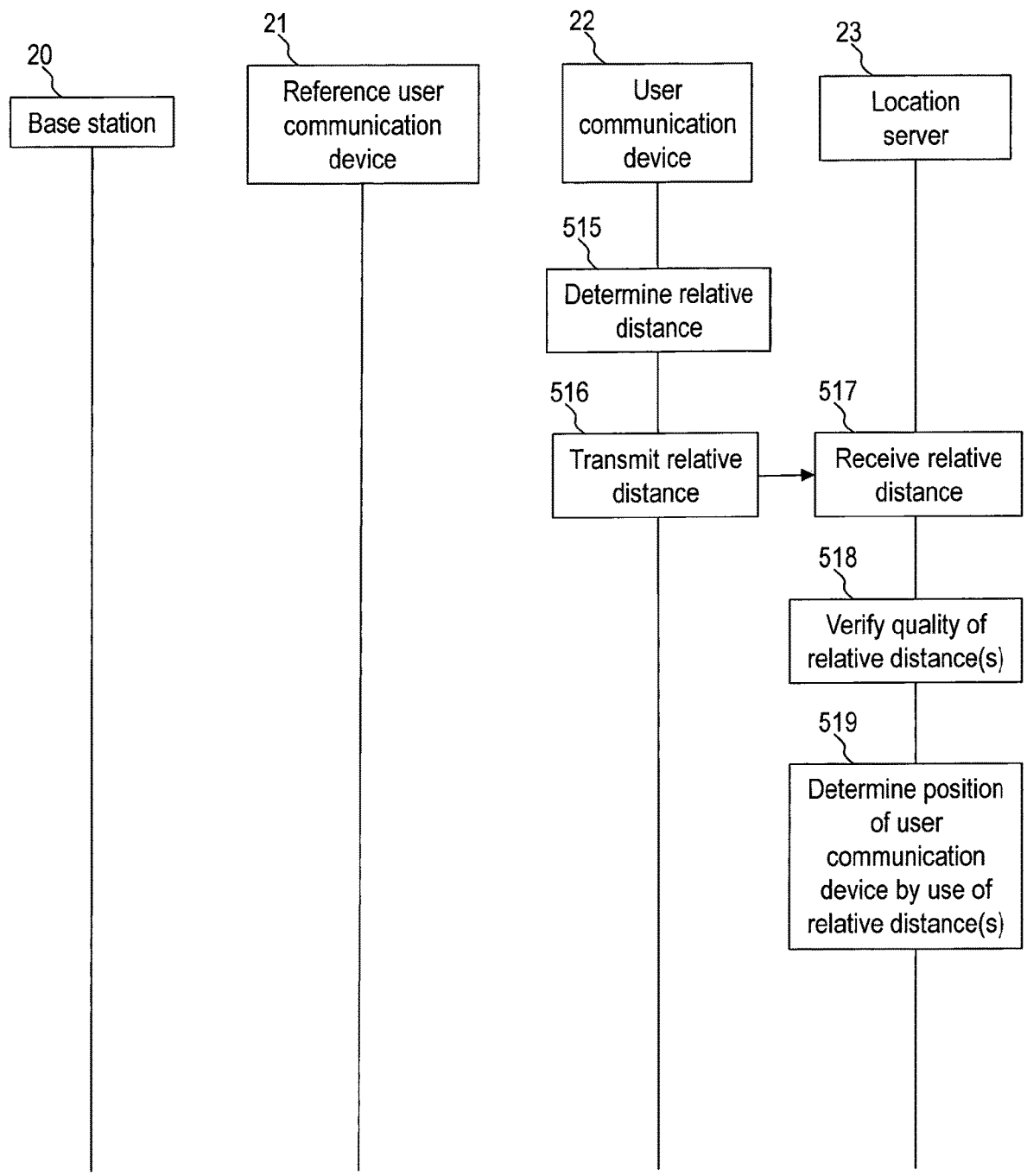

FIG. 5c shows steps that are executed during the repetition to determine relative distances of better quality between the user communication device 22 and selected reference user communication devices 21.

According to the present embodiment, the repetition starts with step 511 a new selection of the set of reference user communication devices 21 from the group used in step 503. From the relative distances, determined or measured in previous step 508 and transmitted to the network communication device such as local server 23, one or several reference user communication devices 21 are identified which are relatively close to user communication device 22, i.e. are in the proximity of user communication device 22. For this purpose, according to one embodiment, the relative distances determined or measured in step 507 are analysed for determining the area of communication network in which the user communication device 22 is located, i.e. for determining an approximate position of user communication device 22. Additionally, according to an embodiment, also the quality information of each of the relative distances determined or measured in step 507 is taken into consideration. For example, sufficient quality indicates that the corresponding reference user communication device 21 is a good candidate for the selection and that the corresponding user communication device 21 could be selected in step 511 again. Not sufficient or insufficient quality indicates that the corresponding reference user communication device 21 is not a good candidate for the selection and that the corresponding user communication device 21 should not be selected in step 511 again. In step 511, the network communication device such as base station 20 selects from the group such reference user communication devices 21 for the set of reference user communication devices 21, which are in the proximity of user communication device 22. According to an embodiment, a reference user communication device 21 is recognized as being located in the proximity of user communication device 22 if a relative distance between reference user communication device 21 and user communication device 22 is within the proximity distance range. According to an embodiment, the relative distance is derived from the previously determined 507 relative distances or it is determined based on the position of the corresponding reference user communication device 21 and the approximate position of user communication device 22. Additionally or alternatively, the quality information of a relative distance that has been previously determined 507 can be considered, as explained above. Thus, according to an embodiment, a reference user communication device 21 is recognized as being located in the proximity of user communication device 22 if the quality information of the corresponding relative distance indicates a sufficient quality.

In step 512, the network communication device such as base station 20 instructs a determining of relative distances in the same way as described above with regard to step 504. Thus also in step 512 corresponding sub-steps 5041, 5042 with regard to instructing transmission and reception of device positioning signals are executed, wherein sub-step 5041 is executed in the same way as described above with regard to sub-step 5041 and sub-step 5122 is executed in the same way as described above with regard to sub-step 5042.

In step 513, each reference user communication device 21 of the selected set of reference user communication devices 21 transmits a corresponding device positioning signal to user communication device 22 as instructed and as described above with regard to step 505.

In step 514, user communication device 22 receives from each reference user communication device 21 of the selected set of reference user communication devices 21 the corresponding device positioning signal as instructed and as described above with regard to step 506.

In step 515, user communication device 22 determines or measures relative distances as described with regard to step 507. In step 516, user communication device 22 transmits the measured or determined relative distances as described above with regard to step 508, wherein, according to an embodiment, also the corresponding quality information is transmitted as specified above with regard to step 508. In step 517, user communication device 22 transmits the measured or determined relative distances to a network communication device such as location server 23 as described with regard to step 509. The network communication device such as location server 23 receives the measured or determined relative distances in step 517 as described with regard to step 509, wherein, according to an embodiment, also the corresponding quality information is received. Subsequently, the network communication device such as location server 23 verifies the quality of the measured or determined relative distances in step 518 as described with regard to step 510.

If it is determined by network communication device(s) such as location server 23 and/or base station 20 that the quality of the determined or measured relative distances is not sufficient for a predetermined number of the relative distances and/or for a predetermined percentage of the determined relative distances, selecting of a set of reference user communication devices 21 and determining relative distances with regard to set of reference user communication devices 21 is repeated again. In particular steps 511 to 518 are repeated.

According to the present embodiment, it is determined that the quality of the determined or measured relative distances is sufficient for the predetermined number of the relative distances and/or for the predetermined percentage of the determined relative distances.

Additionally, it is noted that if the network communication device such as location server 23 determines in step 510 that the overall or total quality is not sufficient, the further execution of the position determination is proceeded with step 519, and it is refrained from the execution of the repetition steps 511 to 518, i.e. steps 511 to 518 are not executed in this case.

Thus, it is proceeded with step 519, in which position of user communication device 22 is determined by the network communication device such as location server 23 by use of the measured or determined relative distances. For this purpose, according to an embodiment, the network communication device such as location server 23 executes anyone of known position determination methods. According to an embodiment, if the selected set of reference user communication devices 21 comprises at least three reference user communication devices 21, the network communication device such as location server 23 executes a triangulation method (as generally known) based on corresponding device reference signals of three reference user communication devices 21 and/or with regard to the three reference user communication devices 21. Thus, the network communication device such as location server 23 determines the position of user communication device 22 by use of the triangulation method as generally known.

The present invention is, however, not limited to three reference user communication devices 21 and to the use of the triangulation method. According to further embodiments, the selected set of reference user communication devices 21 comprises one, at least one, two, at least two, more than three or a plurality of reference user communication devices 21. Moreover, according to further embodiments also other known methods are applied for the determination of the positon of the user communication device 22. They are applied with regard to or based on corresponding device reference signals of the reference user communication devices 21, determined or measured distances between the reference user communication devices 21 and the user communication device 22 and/or the reference user communication devices 21.

According to an embodiment, for example, the Cell-ID method as generally known (also known as Cell of Origin (CoO) or Cell Global Identity (CGI)) is used for the determination of the position of the user communication device 22. According to the Cell-ID method, the location or position of the user communication device 22 within a cell is determined. In particular, the cell, to which the user communication device 22 is connected, i.e. via which the user communication device 22 communicates, and its cell ID are determined.

According to another embodiment, as long as the user communication device 22 can be reached by one or two reference user communication devices 21, the position of the user communication device 22 is within the radius of reference user communication device signal strength, i.e. strength of the corresponding device reference signals. Thus, the position of the user communication device 22 is determined with regard to at least one or at least two reference user communication devices 21 by detecting and analysing the strengths of their device reference signals. Reference user communication device(s) 21 with device reference signals, strength of which are above a threshold, are considered as being most relevant for the determination of the position of the user communication device 22. Then, the position of the user communication device 22 is determined by determining overlap area between radiuses of relevant reference user communication device signal strengths if at least two relevant reference user communication devices 21 have been detected. The position of the user communication device 22 is determined as corresponding to the area covered by radius of a relevant reference user communication device signal strength around the relevant reference user communication device 21 if one relevant reference user communication device 21 has been detected.

The choice of the method for the determination of the position of the user communication device 22 depends according to an embodiment on the requirements of accuracy for the position to be determined. The triangulation method, for example, may provide more accurate position than the further two known methods discussed exemplary above.

Figure 6A:
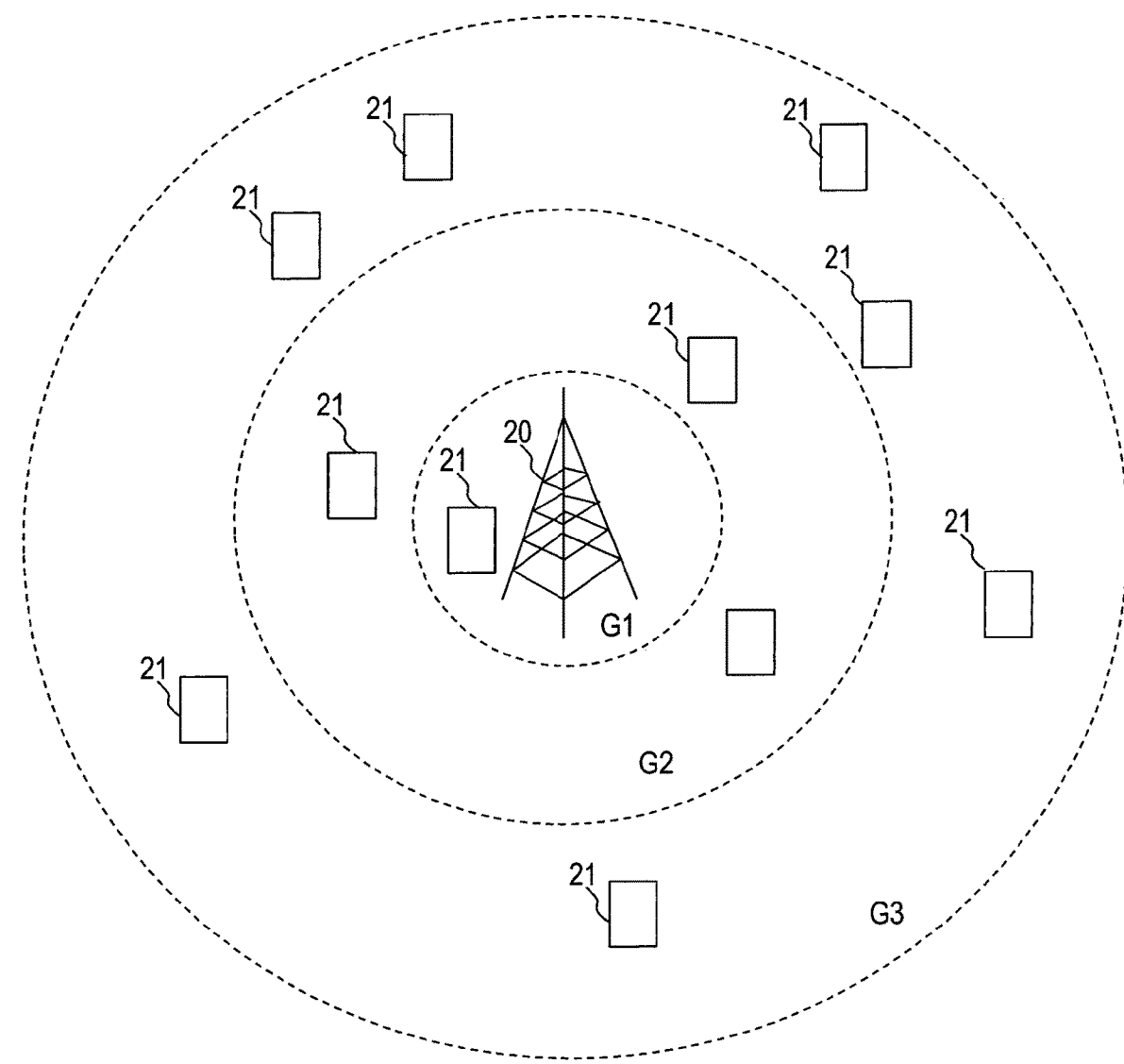
FIG. 6a illustrates a schematic view on grouped reference user communication devices according to an embodiment of the present invention.

FIG. 6*a* illustrates a schematic view on grouped reference user communication devices 21 according to an embodiment of the present invention. In FIG. 6*a*, reference user communication devices 21 are presented as rectangles. Reference user communication devices 21 of FIG. 6*a* are arranged as described in the present application. According to the embodiment of FIG. 6*a*, identification 500 of reference user communication devices 21 is already completed, and a grouping 506 of the reference user communication devices 21 has been executed. According to FIG. 6*a* three groups G1, G2 and G3 have been identified or determined respectively. Each of the groups G1, G2 and G3 is associated with a corresponding distance range, indicated by the broken circular lines, wherein the distance range indicates a range of distances to a network communication device such as base station 20.

Figure 6B:
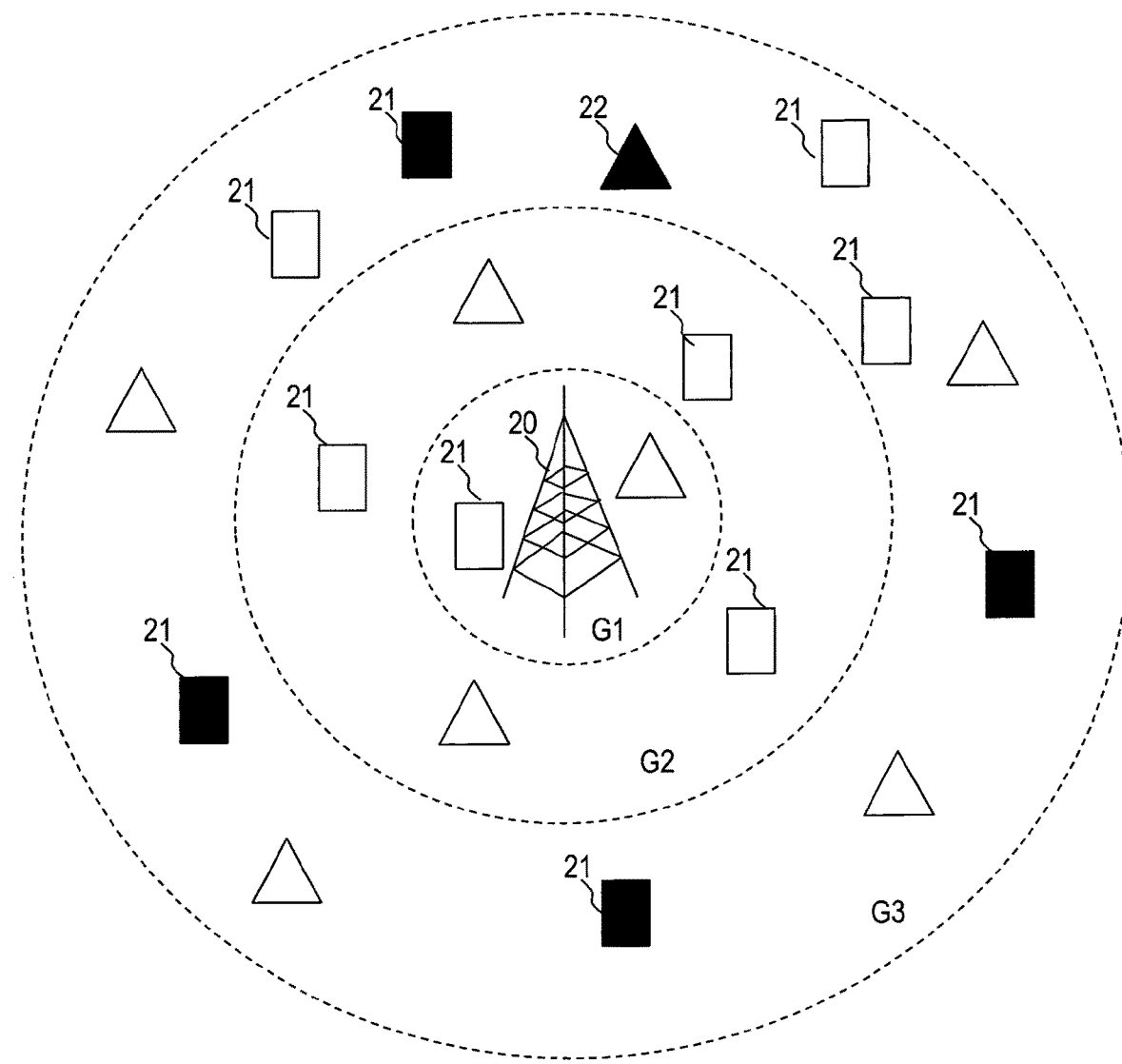
FIG. 6b illustrates a schematic view on a set of reference user communication devices selected from a group of reference user communication devices according to an embodiment of the present invention.

FIG. 6*b* continues the embodiment of FIG. 6*a* and illustrates a schematic view on a set of reference user communication devices 21 selected from a group of reference user communication devices 21 according to an embodiment of the present invention. The selected set of reference user communication devices 21 is indicated by rectangles filled with black colour. Triangles indicate user communication devices, (exact) positions of which in the communication network are not known and have to be determined. The present embodiment focuses exemplary on the determination of the position of one user communication device 22 (see in FIG. 6b the triangle, filled with black colour) only for sake of clarity and for a better overview. In general, the present invention allows corresponding determinations of positions of user communication devices with regard to a plurality (e.g., at least one or more than one) user communication devices.

According to embodiment of FIG. 6b, reference user communication devices 21 are selected from group G3 in view of the relative distance of user communication device 22, position of which is determined, to the communication network device such as base station 20. The relative distance of the user communication device 22 to the communication network device such as base station 20 is within the distance range of group G3. Therefore, group G3 is used for selecting reference user communication devices 21. According to the present embodiment, the selecting of reference user communication devices 21 is executed for the first time, and only the relative distance from user communication device 22 to the network communication device such as base station 20 is known or present as location information of user communication device 22. Therefore, according to the present embodiment, the selecting of the set of reference user communication devices 21 has been executed randomly. The random selection may lead to the situation illustrated in FIG. 6b, where selected reference user communication devices 21 are distributed among the whole area of group G3 in the communication network. Thus, some selected reference user communication devices 21 are in the proximity of the communication device 22, and some selected user communication devices 21 are far away from the communication device 22.

It has to be noted that, although triangles representing user communication devices, positions of which are unknown and have to be determined, have particular positions in FIG. 6b, the network and the communication devices do not know where said user communication devices are actually located.

Figure 6C:
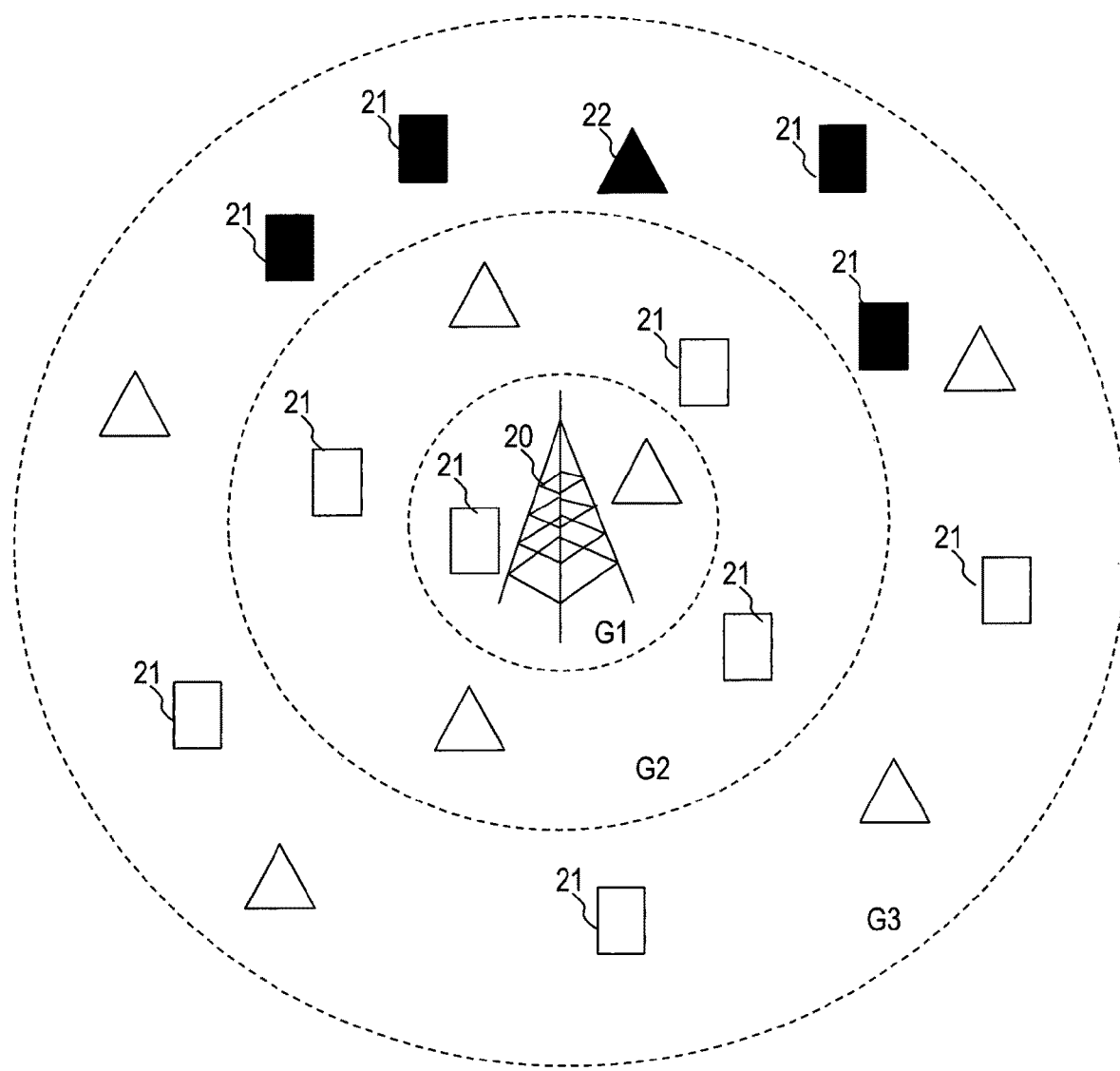
FIG. 6c illustrates a schematic view on a further set of reference user communication devices selected from a group of reference user communication devices according to an embodiment of the present invention.

FIG. 6c illustrates a schematic view on a further set of reference user communication devices 21 selected from a group of reference user communication devices 21 according to an embodiment of the present invention. Also in FIG. 6c, the selected set of reference user communication devices 21 is indicated by rectangles filled with black colour, and the user communication device 22, position of which is determined, is indicated by a triangle that is filled with black colour.

FIG. 6c continues the embodiments of FIGS. 6a and 6b. According to embodiment of FIG. 6c, a determining of relative distances with regard to the selected set of reference user communication devices 21 of FIG. 6b failed, i.e. the relative distances had not sufficient quality. Therefore, a further selection of reference user communication devices 21 has been executed as described above exemplary with regard to step 511. Because computations, executed with regard to the selected set of reference user communication devices 21 of FIG. 6b, provided a further supplementary information on the possible location of user communication device 22, as described above, the selecting of reference user communication devices 21 from group G3 has been executed in the embodiment of FIG. 6c in a more sensitive and fine way by use of the supplementary information. In FIG. 6c, the selected set of reference user communication devices 21 comprises user communication devices 21 that are near user communication device 22, i.e. are located in the proximity of user communication device 22.

Thus, in view of the selected set of reference user communication devices 21 of FIG. 6c, it can be awaited that the corresponding determined or measured relative distances between each reference user communication device 21 of the selected set of reference user communication devices 21 and user communication device 22 will have a sufficient quality for the determination of the positon of user communication device 22.

Figure 7:
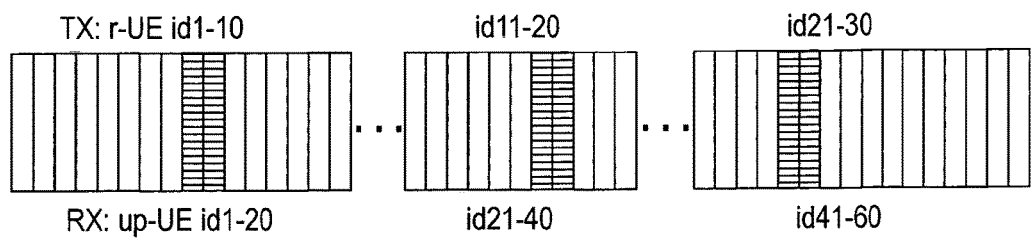
FIG. 7 illustrates examples of time slots to which instructions of a communication network device indicate for transmitting and receiving device position signals according to an embodiment of the present invention.
Figure 7:
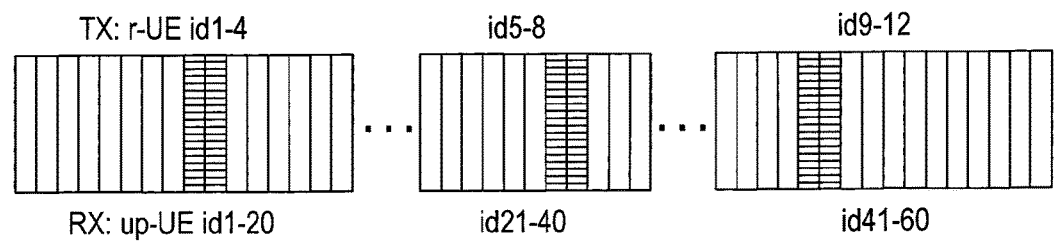

FIG. 7 illustrates examples of time slots to which instructions of a communication network device indicate for transmitting and receiving device position signals according to an embodiment of the present invention. In FIG. 7 time slots, allocated by a network communication device such as base station 20 for transmitting and receiving device position signals, are shown as filled blocks in the sequences of blocks, each block referring to a time slot. The abbreviation "TX: r-UE" above the corresponding time slot sequences indicates transmitting reference user communication devices 21 that are instructed to transmit the corresponding device position signals, wherein the corresponding identification numbers ("id1-10", "id11-20", "id21-30", "id1-4", "id5-8", "id9-12") specify concrete or particular reference user communication devices 21. The abbreviation "RX: up-UE" below the corresponding time slot sequences indicates receiving user communication devices 22 that are instructed to receive the corresponding device position signals, wherein the corresponding identification numbers ("id1-20", "id21-40", "id41-60") specify concrete or particular user communication devices 22. As mentioned, the present invention allows the execution of the position determining with regard to at least one user communication device 22 and, thus, also with regard to at least two user communication devices 22. According to embodiment of FIG. 7, the position determining is executed with regard to three user communication devices 22 (see in FIG. 7 identifications "id1-20", "id21-40", "id41-60").

Further, according to FIG. 7, for each device position signal transmission and reception executed between two devices—a reference user communication device 11 and user communication device 22—at least one corresponding slot is allocated.

Thus, in view of FIG. 7, a network communication device such as base station 20 is configured to determine and allocate time slots to be used for position data signal transmission and reception and, subsequently, to transmit corresponding instructions to the reference user communication devices 21 and the user communication device(s) 22 position(s) of which are determined. The instructions comprise schedules for transmitting the position data signals. According to embodiment of FIG. 7, particular time slot(s) for a transmission or reception of a particular device positioning signal(s) is specified in a corresponding instruction or schedule.

Thus, present invention relates to network communication devices and to user communication devices arranged to support a determination of a position of a user communication device in a communication network. Particularly said devices support a position determination, in which one, at least one or many (e.g. more than one, at least two or at least three) surrounding user communication devices are utilized for obtaining accurate positioning. Further, present invention relates to corresponding methods, computer program products and computer-readable recording media.

Although the invention has been shown and described with respect to certain preferred embodiments, equivalents and modifications will occur to others skilled in the art upon the reading and understanding of the specification. The present invention includes all such equivalents and modifications, and is limited only by the scope of the following claims.

The invention claimed is:

1. A network communication device arranged to coordinate a determination of a position of a user communication device in a communication network, wherein the network communication device is configured to:
    select a set of reference user communication devices in the communication network; and
    instruct a determining of relative distances between each reference user communication device of the selected set of reference user communication devices and the user communication device for the determination of the position of the user communication device, and execute said instructions by:
    transmitting to each reference user communication device of the selected set of reference user communication devices a corresponding instruction instructing a transmission of a corresponding device positioning signal by the corresponding reference user communication device to the user communication device; and
    transmitting to the user communication device an instruction instructing a reception of a corresponding device positioning signal from each reference user communication device of the selected set of reference user communication devices by the user communication device.

2. The network communication device according to claim 1, wherein the network communication device is configured to identify reference user communication devices in the communication network, wherein a user communication device of the communication network is identified as a reference user communication device if:
    position of the user communication device in the communication network is known; or
    the position of the user communication device in the communication network is known and range of movement of the user communication device within a time period before current time is below a movement threshold.

3. The network communication device according to claim 2, wherein the network communication device is configured to execute said identifying with regard to user communication devices in the communication network, distances of which to the network communication device are below a reference device threshold and/or which are located in an area of the communication network.

4. The network communication device of claim 1, wherein the network communication device is configured to select the set of reference user communication devices from a group of reference user communication devices, wherein the group is associated with a corresponding range of distances from the network communication device, and the range of distances comprises a relative distance between the network communication device and the user communication device.

5. The network communication device according to claim 4, wherein the network communication device is configured to select the set of reference user communication devices from the group by selecting reference user communication devices of the group, which are within a proximity of the user communication device.

6. The network communication device according to claim 5, wherein a reference user communication device is determined as being within the proximity of the user communication device if:
    a relative distance between the reference user communication device and the user communication device is within a proximity distance range; and/or
    a discrepancy of a direction from the network communication device to the user communication device from a direction from the network communication device to the reference user communication device is smaller than a discrepancy threshold.

7. The network communication device according to claim 1, wherein the network communication device is configured to execute said selecting by determining at least two groups among the reference user communication devices in the communication network according to:
    a distance of each reference user communication device in the communication network to the network communication device, wherein each group comprises reference user communication devices, distances of which are in a distance range associated to the group; or
    a timing advance between each reference user communication device in the communication network to the network communication device and the distance of each reference user communication device in the communication network to the network communication device, wherein each group comprises reference user communication devices, distances of which are in the distance range associated to the group and timing advances of which are in a timing advance range associated to the group.

8. The network communication device according to claim 1, wherein:
    the corresponding instruction, transmitted to each reference user communication device of the selected set of reference user communication devices, comprises a corresponding schedule for the transmission of the corresponding device positioning signal by the corresponding reference user device to the user communication device; and/or
    the instruction, transmitted to the user communication device, comprises a schedule for the reception of the corresponding device positioning signal from each reference user communication device of the selected set of reference user communication devices.

9. The network communication device according to claim 1, wherein the network communication device is configured to repeat the selecting of the set of reference user communication devices and the instructing of the determining of relative distances, if quality of the determined relative distances is not sufficient for a predetermined number of the relative distances and/or for a predetermined percentage of the determined relative distances.

10. The network communication device according to claim 1, wherein the selected set of reference user communication devices comprises at least one, at least two or at least three reference user communication devices.

11. The network communication device of claim 1, wherein the network communication device is a base station.

12. A user communication device arranged to support a determination of a position of the user communication device in a communication network, wherein the user communication device is configured to:
    determine relative distances from the user communication device to each reference user communication device of a selected set of reference user communication devices for the determination of the position of the user communication device in the communication network, wherein the selected set of reference user communication devices belong to a group of reference user communication devices, wherein the group is associated with a corresponding range of distances from a network communication device, and the range of distances comprises a relative distance between the network communication device and the user communication device.

13. The user communication device according to claim 12, wherein the user communication device is further configured to:
receive, from the network communication device, an instruction, said instruction instructing a reception from each reference user communication device of the selected set of reference user communication devices a corresponding device positioning signal, and receive, from each reference user communication device of the selected set of reference user communication devices, the corresponding device positioning signal; or
receive, from each reference user communication device of the selected set of reference user communication devices, a corresponding device positioning signal.

14. The user communication device according to claim 13, wherein the instruction comprises a schedule for the reception of the corresponding device positioning signal from each reference user communication device of the selected set of reference user communication devices.

15. The user communication device according to claim 12, wherein the user communication device is further configured to:
determine a corresponding relative distance to each reference user communication device of the selected set of reference user communication devices in response to the receipt of the corresponding device positioning signal from the corresponding reference user communication device;
determine the corresponding relative distance to each reference user communication device of the selected set of reference user communication devices by use of the corresponding device positioning signal received from the corresponding reference user communication device and/or by use of signal strength of the corresponding device positioning signal;
determine quality of each of the determined relative distances; determine the quality of each of the determined relative distances by use of the corresponding device positioning signal received from the corresponding reference user communication device and/or by use of strength of the corresponding device positioning signal; and/or
determine the quality of each of the determined relative distances by comparing the strength of the corresponding device positioning signal with a threshold.

16. The user communication device according to claim 12, wherein the user communication device is configured to provide to the network communication device for said determining of the position of the user communication device in the network:
the relative distances; and/or
quality information of each of the relative distances, said quality information indicating quality of the corresponding relative distance.

17. A method arranged for execution by user communications device of a communication network and arranged to support a determination of a position of a user communication device in a communication network, wherein the method comprises the step of:
determining relative distances from the user communication device to each reference user communication device of a selected set of reference user communication devices for the determination of the position of the user communication device in the communication network, wherein the selected set of reference user communication devices belong to a group of reference user communication devices, wherein the group is associated with a corresponding range of distances from a network communication device, and the range of distances comprises a relative distance between the network communication device and the user communication device.

18. A user communication device arranged to support a determination of a position of a further user communication device in a communication network, wherein the user communication device is configured to:
receive, from a network communication device, an instruction instructing a transmission of a device positioning signal to the further user communication device; and
transmit the device positioning signal to the further user communication device;
wherein the user communication device belongs to a group of reference user communication devices associated with a corresponding range of distances from the network communication device, and the range of distances comprises a relative distance between the network communication and the further user communication device.

19. The user communication device according to claim 18, wherein the instruction comprises a schedule for the transmission of the device positioning signal to the further user communication device.

* * * * *